United States Patent
Yi et al.

(10) Patent No.: US 10,272,467 B2
(45) Date of Patent: Apr. 30, 2019

(54) AEROSOL COATING METHOD AND PLASMA-RESISTANT MEMBER FORMED BY THE SAME

(71) Applicant: Komico Co., Ltd., Gyeonggi-do (KR)

(72) Inventors: Sung Hwan Yi, Seoul (KR); Jae Hyun Jung, Incheon (KR); Kyeong Ik Jang, Gyeonggi-do (KR); Kyoung Hwan Ye, Gyeonggi-do (KR)

(73) Assignee: Komico Co., Ltd., Gyeonggi-do (KR)

( * ) Notice: Subject to any disclaimer, the term of this patent is extended or adjusted under 35 U.S.C. 154(b) by 384 days.

(21) Appl. No.: 14/910,289

(22) PCT Filed: Aug. 28, 2013

(86) PCT No.: PCT/KR2013/007711
§ 371 (c)(1),
(2) Date: Feb. 5, 2016

(87) PCT Pub. No.: WO2015/025996
PCT Pub. Date: Feb. 26, 2015

(65) Prior Publication Data
US 2016/0176763 A1 Jun. 23, 2016

(30) Foreign Application Priority Data
Aug. 22, 2013 (KR) .......... 10-2013-0099561

(51) Int. Cl.
*B05D 1/12* (2006.01)
*C23C 24/04* (2006.01)
(Continued)

(52) U.S. Cl.
CPC .............. *B05D 1/12* (2013.01); *B05D 1/02* (2013.01); *C04B 35/505* (2013.01); *C04B 35/62222* (2013.01); *C23C 24/04* (2013.01)

(58) Field of Classification Search
None
See application file for complete search history.

(56) References Cited

U.S. PATENT DOCUMENTS 5,173,202 A    12/1992   Kawabata et al.
5,827,797 A *  10/1998   Cass ............... C04B 35/62227
                                                    505/430
(Continued)

FOREIGN PATENT DOCUMENTS

CN    1453243 A      11/2003
CN    101596508 A    12/2009
(Continued)

OTHER PUBLICATIONS

International Search Report from corresponding International Patent Application No. PCT/KR2013/007711 dated Apr. 1, 2014.
(Continued)

*Primary Examiner* — Michael P. Rodriguez
(74) *Attorney, Agent, or Firm* — Alston & Bird LLP

(57) ABSTRACT

According to an aerosol coating method, a heat treatment process of preliminary ceramic particles having a first mean particle size ($D_{50}$) is performed to form ceramic particles having a second mean particle size ($D_{50}$) in micro unit larger than the first mean particle size. Thereafter, the ceramic particles are mixed with a carrier gas to form an aerosol. The aerosol is sprayed toward the base to form a ceramic coating film on the base.

6 Claims, 1 Drawing Sheet

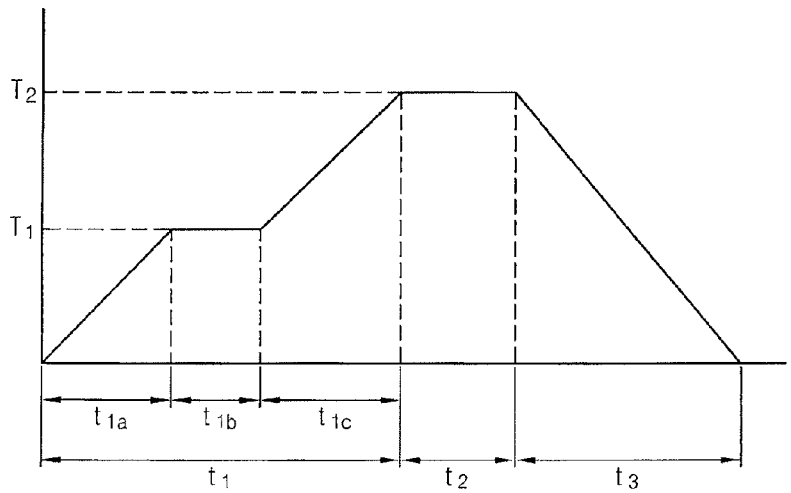

(51) Int. Cl.
  *B05D 1/02*    (2006.01)
  *C04B 35/622*  (2006.01)
  *C04B 35/505*  (2006.01)

(56) References Cited

U.S. PATENT DOCUMENTS

2014/0291245 A1* 10/2014 Inukai .................. B01D 61/145
                                                      210/651
2015/0246851 A1*  9/2015 Miranzo ................ B82Y 30/00
                                                      252/504

FOREIGN PATENT DOCUMENTS

| | | | |
|---|---|---|---|
| CN | 102976617 A | | 3/2013 |
| JP | 2008-056948 A | | 3/2008 |
| JP | 2011-162855 A | | 8/2011 |
| KR | 10-1995-0011017 A | | 5/1995 |
| KR | 19950011017 | * | 5/1995 |
| KR | 2002-0053563 | | 7/2002 |
| KR | 2002-0063563 | | 8/2002 |
| KR | 10-2010-0011576 A | | 2/2010 |
| KR | 20100011582 A | * | 2/2010 |
| KR | 10-0988175 B1 | | 10/2010 |
| KR | 10-2012-0021535 A | | 3/2012 |
| KR | 20120021535 A | * | 3/2012 |

OTHER PUBLICATIONS

Office Action from corresponding Taiwan Patent Application No. 102134035 dated Dec. 4, 2015.

* cited by examiner

[FIG. 1]

```
START
  ↓
HEAT-TREAT PRELIMINARY CERAMIC PARTICLES      — S110
TO FORM CERAMIC PARTICLES
  ↓
MIX CERAMIC PARTICLES WITH CARRIER GAS        — S120
TO FORM AEROSOL
  ↓
SPRAY AEROSOL TOWARD BASE                     — S130
TO FORM CERAMIC COATING FILM
  ↓
END
```

[FIG. 2]

AEROSOL COATING METHOD AND PLASMA-RESISTANT MEMBER FORMED BY THE SAME

CROSS-REFERENCE TO RELATED APPLICATIONS

This application claims priority under 35 USC § 119 to Korean Patent Application No. 10-2013-0099561 filed on Aug. 22, 2013, the contents of which are herein incorporated by reference in its entirety.

TECHNICAL FIELD

The present disclosure relates to an aerosol coating method and a plasma-resistant member formed by the same, and more particularly, to an aerosol coating method in which ceramic particles are sprayed using a carrier gas to form a coating film on a base, and a plasma-resistant member formed by the same.

BACKGROUND ART

A method of forming a thin film on a base includes one of various methods such as a fine particle beam deposition process and an aerosol process.

According to the aerosol process, aerosol containing ceramic particles is sprayed from a nozzle toward a base to collide fine particles to the base. A ceramic coating film is then formed on the base using a colliding force. An example of a prior art about aerosol process is disclosed in Korean Patent Laid-open Publication No. 2002-0053563.

The fine particles allow ceramic particles having a nano size to be carried toward a surface of the base from a spray hole by a carrier gas. Then, while the ceramic particles pass through the spray hole, the ceramic particles may weaken particle fluidity with respect to the spray hole. This is because ceramic particles may be adhered to a spray hole, for example, a nozzle, and a supply line connecting the nozzle with a feeder by static electricity while carrying thereof. In this case, the spray hole may be clogged due to the ceramic particles adhered to the spray hole. As a result, the ceramic particles are non-uniformly supplied to the surface of the base, so that an adhesive force between a ceramic coating film formed by the ceramic particles and the base may be weakened and further plasma resistance of the ceramic coating film may be worsened.

DETAILED DESCRIPTION OF THE INVENTION

Technical Problem

The present disclosure provide an aerosol coating method that can improve an adhesive force between a ceramic coating film and a base and further improve plasma resistance of the ceramic coating film.

The present disclosure also provides a plasma-resistant member having improved adhesive force between a ceramic coating film and a base and improved plasma resistance.

Technical Solution

In accordance with an exemplary embodiment, there is provided an aerosol coating method in which a heat treatment process of preliminary ceramic particles having a first mean particle size (D50) is performed to form ceramic particles having a second mean particle size (D50) in micro unit larger than the first mean particle size (D50). Thereafter, the ceramic particles are mixed with a carrier gas to form an aerosol. The aerosol is sprayed toward the base to form a ceramic coating film on the base.

In an embodiment of the present disclosure, the second mean particle size may have a range of 4.5-12.0 μm.

In an embodiment of the present disclosure, the heat treatment process may be performed at a temperature ranging from 500° C. to 1,400° C. Further, the thermal treatment process may be performed at a temperature ranging from 1,000° C. to 1,200° C.

In an embodiment of the present disclosure, the thermal treatment process may include a multi-stage heating section, a temperature maintenance section, and a cooling section. The multi-stage heating section may sequentially include a first heating section, a pause section, and a second heating section, and the second heating section may have a temperature increase rate lower than the first heating section. Also, the temperature maintenance section may have a maintenance time in a range of 1-5 hours. The cooling section may have a cooling rate not higher than 270° C./hour.

In accordance with another exemplary embodiment, a plasma-resistant member includes a base, and a ceramic coating film which is formed on the base by any of the above-described aerosol coating methods. The ceramic coating film may have an adhesive force in a range of 14.0-17.5 MPa with respect to the base. Also, the ceramic coating film may have a hardness in a range of 400-550 Hv. The ceramic coating film may have an etch rate in a range of 0.52-0.58 μm/h when the etch rate is measured by a plasma etch using a power of 700 W and a fluorocarbon gas as an etching gas.

Advantageous Effects

In an aerosol coating method and a ceramic coating film according to embodiments of the present disclosure, preliminary ceramic particles are heat-treated to obtain ceramic particles having an increased mean particle size, and the ceramic particles obtained thus are used in a heat treatment process to increase the volume and weight of the ceramic particles. Therefore, in the case where the ceramic particles are sprayed together with a carrier gas, kinetic energy can be increased to improve a bonding force between the ceramic particles coated on a surface of the base, and the forming rate of the coating film can be increased. Also, since the ceramic particles with the increased kinetic energy are sprayed through a spray hole, the ceramic particles can overcome an electrostatic attraction force between the spray hole and the ceramic particles and thus can be smoothly sprayed toward the base.

Also, since the shape of the preliminary ceramic particles is diversified through the heat treatment process, the particle fluidity in the spray hole is improved. As a result, the uniformity of the coating film is improved and thus the ceramic coating film can have an improved adhesive force and plasma resistance with respect to the base.

BRIEF DESCRIPTION OF THE DRAWINGS

FIG. 1 is a flowchart illustrating an aerosol coating method in accordance with an example embodiment of the present invention.

FIG. 2 is a graph illustrating a temperature profile in the heat treatment process of FIG. 1.

MODE OF THE INVENTION

Hereinafter, an aerosol coating method, and a ceramic coating film formed by the same will be described in detail with reference to the accompanying drawings. As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the invention are encompassed in the present invention. Like reference numerals in the drawings denote like elements. In the accompanying drawings, the dimensions of structures are exaggerated for clarity.

While such terms as 'first', 'second', and the like may be used to describe various elements, such elements should not be limited to the above terms. The above terms are used only to distinguish one element from another. For example, a first element may be referred to as a second element without departing from the scope of rights of the present disclosure, and likewise a second element may be referred to as a first element.

In the following description, the technical terms are used only for explain a specific exemplary embodiment while not limiting the present invention. The terms of a singular form may include plural forms unless referred to the contrary. The meaning of "include", "comprise", "including", or "comprising" specifies a property, a figure, a process, an operation, a component, a part, or combinations thereof but does not exclude other properties, figures, processes, operations, components, parts, or combinations thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flowchart illustrating an aerosol coating method according to an example embodiment of the present disclosure. FIG. 2 is a graph illustrating a temperature profile in the heat treatment process of FIG. 1.

Referring to FIGS. 1 and 2, in an aerosol coating method according to an example embodiment of the present disclosure, a heat treatment process is first performed against preliminary ceramic particles (S110). The preliminary ceramic particles may include an aluminum-containing oxide, a yttria-containing oxide, a titanium oxide, silicon particles such as yttrium aluminum garnet (YAG), or mixtures thereof. The preliminary ceramic particles have a first mean particle size (D50). For example, the preliminary ceramic particles may have a diameter distribution ranging from 1 µm to 20 µm. The first mean particle size (D50) may be 3.5 µm.

By the heat treatment process, ceramic particles are formed. The ceramic particles may have a second mean particle size larger than the first mean particle size That is, the preliminary ceramic particles are agglomerated through the heat treatment process, and thus the ceramic particles may have an increased volume and an increased second mean particle size (D50). Since the ceramic particles have increased volume and diameter, the ceramic particles may have increased kinetic energy in a subsequent coating process in which the ceramic particles are sprayed toward the base to form a ceramic coating film. As a result, the bonding force between the ceramic particles coated on the surface of the base can be increased.

Further, since the ceramic particles have increased second mean particle size in a micro unit, the particle fluidity with respect to the spray hole can be improved when the ceramic particles are sprayed from the spray hole in a coating process of the ceramic particles. That is, the ceramic particles have increased kinetic energy. Also, when the ceramic particles are sprayed through a spray hole, the ceramic particles can overcome an electrostatic attraction force between the spray hole and the ceramic particles and thus can be smoothly sprayed toward the base. As a result, spray hole clogging in which the ceramic particles are adhered to the spray hole and thus the spray hole is clogged can be prevented. Further, since the ceramic particles are uniformly supplied on the base through the spray hole, a ceramic coating film including the ceramic particles on the base can have uniform characteristics.

Meanwhile, in the case where the preliminary ceramic particles are prepared by pulverizing a ceramic raw material, micro cracks or surface stress may be generated at surfaces of the ceramic particles. The heat treatment process of the preliminary ceramic particles may reduce the surface stress of the preliminary ceramic particles. Therefore, it can be prevented that the ceramic particles are pulverized in the subsequent aerosol process using the ceramic particles formed by thermally treating the preliminary ceramic particles. Thus, the ceramic coating film formed in the aerosol process can have improved strength and an adhesive force against the base. Further, since angular portions of the preliminary ceramic particles are trimmed, the ceramic particles may have a polygonal shape similar to a spherical shape. As a result, spray hole clogging in which the ceramic particles are adhered to the spray hole and thus the spray hole is clogged can be prevented.

Referring to FIGS. 1 and 2, the ceramic particles may have a second mean particle size (D50) in a range of 4.5-12.0 µm. In the case where the ceramic particles have a mean particle size less than 4.5 µm, clogging of the spray hole may occur while a coating process is performed through the spray hole, so that uniformity of the ceramic coating film may be deteriorated, and further plasma resistance of the ceramic coating film may be deteriorated and the adhesive force between the base and the ceramic coating film may be reduced. On the other hand, in the case where the ceramic particles have a mean particle size larger than 12.0 µm, kinetic energy of the ceramic particles excessively increases due to an increase in volume of the ceramic particles to erode an existing coating film during a coating process above a predetermined time, so that the process efficiency of the coating film may be rather deteriorated.

The heat treatment process may be performed at a temperature ranging from 500° C. to 1,400° C. When the temperature of the heat treatment process is less than 500° C., since the ceramic particles formed by the heat treatment process fail to have a sufficient mean particle size, the adhesive force between the ceramic coating film and the base, and the hardness and plasma resistance of the coating film may not be sufficiently improved. On the other hand, when the temperature of the heat treatment process exceeds 1,400° C., the mean particles size of the ceramic particles may be excessively increased. Further, the heat treatment process may be performed at a temperature ranging from 1,000° C. to 1,200° C.

Referring to FIG. 2, the heat treatment process may include a multi-stage heating section (t1), a temperature maintenance section (t2) and a cooling section (t3). That is, in the case where the preliminary ceramic particles are rapidly heated or cooled, the preliminary ceramic particles are subject to heat impact, so that the ceramic particles may be easily pulverized and thus the strength of the ceramic coating film formed using the ceramic particles may be reduced. Therefore, in the case where the heat treatment process is performed with the above-mentioned temperature profile, the heat impact on the preliminary ceramic particles may be reduced.

Particularly, the multi-stage heating section may be provided. In the multi-stage heating section, the preliminary ceramic particles may be primarily heated at a high temperature increase rate, and then secondarily heated at a relatively low temperature increase rate. Thus, since the heating process is performed in a relatively low temperature range at a high temperature increase rate in an initial period, the process time may be shortened, and since the heating process is performed in a relatively high temperature range at a low temperature increase rate in a late period, the heat impact on the preliminary ceramic particles may be suppressed. As a result, the multi-stage heating section in which as the heating temperature rises, the temperature increase rate is gradually decreased may be provided.

For example, the multi-stage heating section may include a two-stage heating section. The two-stage heating section which is able to increase the temperature from room temperature to a second temperature (T2) that is a maximum temperature, may include a first heating section in which the temperature rises from room temperature to a first temperature (T1) at a first heating rate during a first heating time (t1a), a pause section in which the first temperature is kept during a predetermined time (i.e., a pause period (t1b)), and a second heating section in which the temperature rises from the first temperature (T1) to the second temperature (T2) at a second heating rate during a second heating time (t1c). Thus, in the relatively low temperature section, the temperature rises at the first temperature increase rate that is relatively high, whereas in the relatively high temperature section, the temperature rises at the second temperature increase rate, so that the heat impact on the preliminary ceramic particles can be suppressed.

For example, the first temperature (T1) may be 600° C., and the second temperature (T2) may be 1,100° C.

The temperature maintenance section (t2) may be maintained, for example, during 1 hour to 5 hours. In the case where the temperature maintenance section (t2) is less than 1 hour, since the temperature maintenance time for agglomeration of the preliminary ceramic particles is insufficient, the ceramic particles may not have a sufficient mean particle size. On the other hand, in the case where the temperature maintenance time (t2) exceeds 5 hours, since the mean particle size of the ceramic particles increases excessively, the hardness of the ceramic coating film including the ceramic particles is rather reduced and the plasma resistance may be also deteriorated.

The cooling section (t3) corresponds to a section in which the heat treatment temperature decreases from the maximum temperature (Tmax) to room temperature. The cooling section (t3) may have a cooling rate not higher than 270° C./hour. In the case where the cooling rate exceeds 270° C. and thus the cooling section (t3) is rapidly cooled, the ceramic particles may be pulverized in the aerosol process, and fail to have a sufficient mean particle size, so that the ceramic coating film may fail to have improved characteristics (e.g., adhesive force, hardness, and plasma resistance).

Referring to FIG. 1, the ceramic particles are mixed with a carrier gas to form an aerosol (S120). The carrier gas may be provided at a flow rate ranging from 15 slm (standard liter per minute) to 40 slm. The carrier gas may include, for example, an inert gas, such as argon.

Thereafter, the aerosol is sprayed toward the base to form a ceramic coating film on the base (S130). As a result, a plasma-resistant member including the base and the ceramic coating film is formed. Meanwhile, while the ceramic particles are supplied, a vibrator may be used so as to allow the ceramic particles to float. The vibrator may vibrate at a frequency ranging from 50 hz to 1,000 hz. The base may include ceramic, an aluminum-containing metal, or quartz. Also, the plasma-resistant member formed by the aerosol process may be applied, for example, to a window disk, a gas injector, a deposition shield, a shutter, etc.

Evaluation on Ceramic Coating Film According to Heat Treatment Condition

Preliminary ceramic particles (Comparative Example 2) formed of Yttria (Y2O3) were prepared. The prepared preliminary ceramic particles have a diameter distribution in a range of 1-20 μm, and a mean particle size (D50) of 3.5 μm. The preliminary ceramic particles also have an angular flake shape. The preliminary ceramic particles corresponding to Comparative Example 2 were heat-treated at a process temperature (T2) for 3 hours to form ceramic particles having an increased mean particle size. The process temperature was changed to form ceramic particles. Thereafter, the ceramic particles were sprayed onto an aluminum base (size: 50*50*5 mm) by an aerosol process to form a ceramic coating film (Embodiments 1 to 10). The ceramic coating films were formed with a thickness of 20 μm. Meanwhile, ceramic particles (Comparative Example 1) formed of Yttria (Y2O3) in a nano size were prepared. The nano-sized ceramic particles have a mean particle size (D50) of 0.8 μm.

Table 1 below shows adhesive force (MPa), hardness (Hv) and plasma etch rate (μm/h) related to plasma resistance of ceramic coating films which were formed by an aerosol process while changing the mean particle size of ceramic particles according to the process temperature. The formed ceramic coating films have a thickness of 20 μm. Meanwhile, in order to measure the plasma etch rate, an etch process was performed at a power of 700 W for 2 hours by using fluorocarbon (CF) as an etch gas.

As shown in Table 1, when the heat treatment temperature was controlled to a range of 500-1,400° C., it can be confirmed that the ceramic coating films have superior adhesive force, hardness and plasma resistance. On the other hand, when the heat treatment temperature is controlled to 1,500° C., it can be confirmed that the adhesive force, hardness and plasma resistance are rather deteriorated.

Particularly, when the heat treatment temperature was controlled to a range of 1,000-1,200° C., it can be confirmed that the adhesive force has a range of 16.0-17.5 MPa, the hardness has a range of 500-550 Hv, and the plasma etch rate has a range of 0.52-0.58 μm/h. Therefore, when the heat treatment temperature was set to the range of 1,000-1,200° C., it can be confirmed that the ceramic coating films have superior adhesive force, hardness and plasma resistance.

TABLE 1

| Item | Heat treatment temp. (° C.) | Mean particle size ($D_{50}$, µm) | Adhesive force (MPa) | Hardness (Hv) | Plasma etch rate (µm/h) |
|---|---|---|---|---|---|
| Comparative Example 1 | — | 0.8 | 12-13 | 300-350 | — |
| Comparative Example 2 | — | 3.5 | 13-14 | 350-400 | 0.62 |
| Embodiment 1 | 500 | 4.5 | 14-15 | 400-450 | 0.58 |
| Embodiment 2 | 600 | 4.5 | 14-15 | 400-450 | 0.56 |
| Embodiment 3 | 700 | 4.5 | 14-15 | 400-450 | 0.56 |
| Embodiment 4 | 800 | 4.5 | 14-15 | 400-450 | 0.56 |
| Embodiment 5 | 900 | 6.5 | 14-15 | 400-450 | 0.52 |
| Embodiment 6 | 1,000 | 7.0 | 16-17 | 500-550 | 0.52 |
| Embodiment 7 | 1,100 | 7.0 | 16-17.5 | 500-550 | 0.52 |
| Embodiment 8 | 1,200 | 9.0 | 16-17.5 | 500-550 | 0.52 |
| Embodiment 9 | 1,300 | 11.5 | 16-17 | 500-525 | 0.54 |
| Embodiment 10 | 1,400 | 12.0 | 16-17 | 500-525 | 0.54 |
| Comparative Example 3 | 1,500 | 15.0 | 13-14 | 350-400 | 0.62 |

Characteristics of the ceramic coating films were measured according to the maintenance time of the heat treatment process temperature (T2). As in Embodiment 7 of Table 1, in Embodiments 11 to 15, and Comparative Example 4, the heat treatment process temperature (T2) was controlled to 1,100° C. and ceramic particles formed of Yttria (Y2O3) were used. The characteristics of the ceramic coating films according to the maintenance time of the heat treatment process temperature (T2), i.e., adhesive force, hardness, and plasma etch rate, were measured.

Table 2 below shows adhesive force (MPa), hardness (Hv) and plasma etch rate (µm/h) related to plasma resistance of ceramic coating films which were formed by an aerosol process while changing the mean particle size of ceramic particles according to the maintenance time of the heat treatment process temperature (T2). The formed ceramic coating films have a thickness of 20 µm. Also, in order to measure the plasma etch rate, an etch process was performed at a power of 700 W for 2 hours by using fluorocarbon (CF) as an etch gas.

When the heat treatment process temperature (T2) has a maintenance time ranging from 1 hour to 5 hours as shown in Table 2, it can be confirmed that the adhesive force has a range of 15.0-17.5 MPa, the hardness has a range of 450-550 Hv, and the plasma etch rate has a range of 0.52-0.58 µm/h. On the other hand, when the heat treatment process temperature (T2) has a maintenance time of 6 hours, it can be confirmed that the adhesive force, hardness and plasma resistance are rather deteriorated. Therefore, when the maintenance time of the heat treatment process temperature (T2) was 1-5 hours, it can be confirmed that the ceramic coating films have superior adhesive force, hardness and plasma resistance.

TABLE 2

| Item | Temperature maintenance time (hour) | Mean particle size ($D_{50}$, µm) | Adhesive force (MPa) | Hardness (Hv) | Plasma etch rate (µm/h) |
|---|---|---|---|---|---|
| Comparative Example 1 | — | 0.8 | 12-13 | 300-350 | — |
| Comparative Example 2 | — | 3.5 | 13-14 | 350-400 | 0.62 |
| Embodiment 11 | 1 | 5.0 | 15-16 | 450-500 | 0.58 |
| Embodiment 12 | 2 | 6.0 | 15-16 | 450-500 | 0.56 |
| Embodiment 13 | 3 | 7.0 | 16-17.5 | 500-550 | 0.52 |
| Embodiment 14 | 4 | 7.0 | 16-17 | 500-550 | 0.55 |
| Embodiment 15 | 5 | 7.5 | 16-17 | 500-550 | 0.55 |
| Comparative Example 4 | 6 | 9.5 | 14-15 | 400-450 | 0.61 |

Meanwhile, characteristics of ceramic coating films according to a cooling rate while the heat treatment temperature drops from a maximum temperature (Tmax) to room temperature (25° C.) were measured. As in Embodiment 13 of Table 2, in Embodiments 16 to 20, and Comparative Example 5, the heat treatment process temperature (T2) was controlled to 1,100° C., the maintenance time of the heat treatment process temperature was set to 3 hours, and ceramic particles formed of Yttria (Y2O3) were used. The characteristics of the ceramic coating films according to the cooling rate of the heat treatment process, i.e., adhesive force, hardness, and plasma etch rate, were measured.

Table 3 below shows adhesive force (MPa), hardness (Hv) and plasma etch rate (µm/h) related to plasma resistance of ceramic coating films which were formed by an aerosol process, according to the mean particle size of ceramic particles and the cooling rate. The formed ceramic coating films have a thickness of 20 µm. Also, in order to measure the plasma etch rate, an etch process was performed at a power of 700 W for 2 hours by using fluorocarbon (CF) as an etch gas.

When the cooling in the cooling section was slowly performed at a cooling rate not higher than 270° C./hour as shown in Table 3, it can be confirmed that the adhesive force has a range of 15.0-17.5 MPa, the hardness has a range of 450-550 Hv, and the plasma etch rate has a range of 0.52-0.58 µm/h. In this case, it can be confirmed that the ceramic coating films have superior adhesive force, hardness and plasma resistance. Meanwhile, when the cooling in the cooling section was rapidly performed at a cooling rate exceeding 270° C., the ceramic particles may be pulverized in the aerosol process, and fail to have a sufficient mean particle size, so that the ceramic coating films fail to have improved characteristics (e.g., adhesive force, hardness, and plasma resistance).

TABLE 3

| Item | Cooling time (hour) | Cooling rate (° C./hour) | Mean particle size ($D_{50}$, µm) | Adhesive force (MPa) | Hardness (Hv) | Plasma etch rate (µm/h) |
|---|---|---|---|---|---|---|
| Comparative Example 1 | — | — | 0.8 | 12-13 | 300-350 | — |
| Comparative Example 2 | — | — | 3.5 | 13-14 | 350-400 | 0.62 |
| Embodiment 16 | 4 | 270 | 6.0 | 15-16 | 450-500 | 0.58 |
| Embodiment 17 | 5 | 215 | 7.0 | 16-16.5 | 500-550 | 0.54 |
| Embodiment 18 | 6 | 180 | 7.0 | 16-17.5 | 500-550 | 0.54 |

TABLE 3-continued

| Item | Cooling time (hour) | Cooling rate (° C./hour) | Mean particle size ($D_{50}$, μm) | Adhesive force (MPa) | Hardness (Hv) | Plasma etch rate (μm/h) |
|---|---|---|---|---|---|---|
| Embodiment 19 | 7 | 155 | 7.5 | 16-17.5 | 500-550 | 0.52 |
| Embodiment 20 | 8 | 135 | 7.5 | 16-17.5 | 500-550 | 0.52 |
| Comparative Example 5 | 9 | 120 | 7.5 | 16-17.5 | 500-550 | 0.52 |

The present invention has been particularly shown and described with reference to the embodiments illustrated in the appended drawings. The embodiments are, however, provided as examples only used for a better understanding of the present invention. It would be obvious to those of ordinary skill in the art that the above embodiments are to cover all modifications, equivalents, and alternatives falling within the scope of the invention. Accordingly, it will be understood that various changes in form and details may be made therein without departing from the spirit and scope of the following claims.

INDUSTRIAL APPLICABILITY

In an aerosol coating method and a ceramic coating film formed by the same according to embodiments of the present disclosure, preliminary ceramic particles are heat-treated to obtain ceramic particles having an increased mean particle size, and these ceramic particles are used to enable the ceramic coating film to have superior adhesive force, hardness and plasma resistance.

An aerosol coating method and a ceramic coating film formed by the same according to embodiments of the present disclosure may be applied to components for production facilities of semiconductor devices or display devices, thus capable of improving endurance of the components.

The invention claimed is:

1. An aerosol coating method comprising:
performing a heat treatment process of preliminary ceramic particles having a first mean particle size ($D_{50}$) to form ceramic particles having a second mean particle size ($D_{50}$) larger than the first mean particle size;
mixing the ceramic particles with a carrier gas to form an aerosol; and
spraying the aerosol toward a base to form a ceramic coating film on the base,
wherein the heat treatment process comprises a multi-stage heating section, a temperature maintenance section, and a cooling section,
and the multi-stage heating section sequentially comprises a first heating section, a pause section, and a second heating section, and the second heating section has a temperature increase rate lower than that of the first heating section.

2. The aerosol coating method of claim 1, wherein the second mean particle size ($D_{50}$) has a range of 4.5-12.0 μm.

3. The aerosol coating method of claim 1, wherein the heat treatment process is performed at a temperature ranging from 500° C. to 1,400° C.

4. The aerosol coating method of claim 3, wherein the heat treatment process is performed at a temperature ranging from 1,000° C. to 1,200° C.

5. The aerosol coating method of claim 1, wherein the temperature maintenance section has a maintenance time in a range of 1-5 hours.

6. The aerosol coating method of claim 1, wherein the cooling section has a cooling rate not higher than 270° C./hour.

* * * * *